United States Patent
Hong et al.

(10) Patent No.: US 10,438,045 B2
(45) Date of Patent: Oct. 8, 2019

(54) SECURITY DEVICE AND DISPLAY DEVICE INCLUDING THE SAME

(71) Applicant: SAMSUNG DISPLAY CO., LTD., Yongin-si, Gyeonggi-do (KR)

(72) Inventors: Won Ki Hong, Yongin-si (KR); Tae Hee Lee, Yongin-si (KR)

(73) Assignee: SAMSUNG DISPLAY CO., LTD., Gyeonggi-Do (KR)

(*) Notice: Subject to any disclaimer, the term of this patent is extended or adjusted under 35 U.S.C. 154(b) by 3 days.

(21) Appl. No.: 15/712,726

(22) Filed: Sep. 22, 2017

(65) Prior Publication Data

US 2018/0196989 A1 Jul. 12, 2018

(30) Foreign Application Priority Data

Jan. 9, 2017 (KR) .................. 10-2017-0002899

(51) Int. Cl.
*G06K 9/00* (2006.01)

(52) U.S. Cl.
CPC ....... *G06K 9/00087* (2013.01); *G06K 9/0002* (2013.01); *G06K 9/00288* (2013.01); *G06K 9/00617* (2013.01); *G06K 9/00892* (2013.01)

(58) Field of Classification Search
CPC ........... G06K 9/00087; G06K 9/00288; G06K 9/00617
See application file for complete search history.

(56) References Cited

U.S. PATENT DOCUMENTS

| | | | |
|---|---|---|---|
| 6,307,956 B1* | 10/2001 | Black | G06F 3/03545 382/124 |
| 7,511,702 B2* | 3/2009 | Hotelling | G06F 3/0414 178/18.06 |
| 7,538,760 B2* | 5/2009 | Hotelling | G06F 3/0414 178/18.06 |
| 8,443,199 B2* | 5/2013 | Kim | G06F 3/03547 345/173 |
| 8,654,524 B2* | 2/2014 | Pance | G06F 1/1616 361/679.55 |
| 8,686,952 B2* | 4/2014 | Burrough | G06F 3/016 345/156 |
| 8,787,006 B2* | 7/2014 | Golko | G06F 1/163 361/679.03 |
| 9,079,092 B2* | 7/2015 | Stack | A63B 71/145 |
| 9,178,509 B2* | 11/2015 | Bernstein | H01H 13/14 |
| 9,274,660 B2* | 3/2016 | Bernstein | G06F 3/016 |
| 9,513,663 B2* | 12/2016 | Jones | G06F 1/1626 |
| 9,954,858 B2* | 4/2018 | Lee | G06K 9/00006 |
| 2003/0120183 A1* | 6/2003 | Simmons | A61F 4/00 600/595 |

(Continued)

FOREIGN PATENT DOCUMENTS

| | | |
|---|---|---|
| KR | 101196759 B1 | 10/2012 |
| KR | 101549558 B1 | 8/2015 |
| KR | 101617872 B1 | 4/2016 |

*Primary Examiner* — Mia M Thomas
(74) *Attorney, Agent, or Firm* — Cantor Colburn LLP (57) ABSTRACT

A security device includes a biometric sensor which senses biometric information of a user, a pressure sensor which senses a contact surface caused by the user and to obtain force distribution information of the contact surface, and a user authenticator which performs user authentication with reference to the biometric information and the force distribution information.

16 Claims, 9 Drawing Sheets

(56) References Cited

U.S. PATENT DOCUMENTS

| | | | |
|---|---|---|---|
| 2005/0215987 A1* | 9/2005 | Slatkine | A61B 18/203 606/9 |
| 2005/0240778 A1* | 10/2005 | Saito | G06K 19/0723 713/186 |
| 2006/0161992 A1* | 7/2006 | Kempf | G06K 9/00154 726/34 |
| 2006/0259102 A1* | 11/2006 | Slatkine | A61B 17/205 607/88 |
| 2007/0297064 A1* | 12/2007 | Watanabe | B60K 35/00 359/630 |
| 2010/0027854 A1* | 2/2010 | Chatterjee | G06F 3/016 382/124 |
| 2010/0316264 A1* | 12/2010 | Ferren | G07C 9/00158 382/117 |
| 2014/0028575 A1* | 1/2014 | Parivar | G06F 3/0414 345/173 |
| 2014/0085213 A1* | 3/2014 | Huppi | 345/173 |
| 2014/0149281 A1* | 5/2014 | Shvarts | G06Q 30/06 705/39 |
| 2014/0306799 A1* | 10/2014 | Ricci | H04W 4/21 340/5.83 |
| 2015/0241939 A1* | 8/2015 | Im | G06F 1/3265 715/867 |
| 2016/0078277 A1* | 3/2016 | Sprigg | G06K 9/00174 382/119 |
| 2017/0091340 A1* | 3/2017 | Yoon | G06F 1/1652 |
| 2017/0168769 A1* | 6/2017 | Jeon | G06F 3/04817 |
| 2017/0180988 A1* | 6/2017 | Kim | A61B 5/6887 |
| 2018/0210600 A1* | 7/2018 | Lee | G06F 3/0416 |

\* cited by examiner

SECURITY DEVICE AND DISPLAY DEVICE INCLUDING THE SAME

This application claims priority to Korean Patent Application No. 10-2017-0002899, filed on Jan. 9, 2017, and all the benefits accruing therefrom under 35 U.S.C. § 119, the content of which in its entirety is herein incorporated by reference.

BACKGROUND

1. Field

Exemplary embodiments of the invention relate to a security device and a display device including the same.

2. Description of the Related Art

Biometrics are recently spotlighted as units for information security and information authentication.

The biometrics based on individual physical features such as a face, a finger print, an iris, etc., are being applied to various fields such as portable terminals such as a smartphone and a tablet personal computer ("PC"), a vehicle, and an access control device.

SUMMARY

An exemplary embodiment of the invention relates to a security device in which a security function is enhanced by performing user authentication using both a biometric sensor and a pressure sensor.

A security device according to an exemplary embodiment of the invention includes a biometric sensor which senses biometric information of a user, a pressure sensor which senses a contact surface caused by the user and obtains force distribution information of the contact surface, and a user authenticator which performs user authentication with reference to the biometric information and the force distribution information.

In an exemplary embodiment, the biometric sensor may sense at least one of a finger print, a palm print, a palm vein, a face, and an iris of the user.

In an exemplary embodiment, the user authenticator may perform the user authentication by comparing the biometric information with previously registered biometric information and comparing the force distribution information with previously registered force distribution information.

In an exemplary embodiment, the security device further may include a memory which stores the previously registered biometric information of the user and the previously registered force distribution information.

A display device according to an exemplary embodiment of the invention includes a biometric sensor which senses biometric information of a user, a pressure sensor which senses a contact surface caused by the user and obtains force distribution information of the contact surface, a user authenticator which performs user authentication with reference to the biometric information and the force distribution information, and a display panel disposed on one surface of one of the biometric sensor and the pressure sensor to display an image.

In an exemplary embodiment, the biometric sensor may sense a finger print of the user.

In an exemplary embodiment, the biometric sensor may sense finger prints of fingers of the user who grasps the display device.

In an exemplary embodiment, the pressure sensor may obtain positions and magnitudes of touches input by the user grasping the display device.

In an exemplary embodiment, the user authenticator may perform user authentication by comparing the finger prints of the fingers that grasp the display device with previously registered finger prints and comparing magnitudes of the touches with previously registered force distribution information.

In an exemplary embodiment, the user authenticator may perform user authentication by further comparing positions of the touches with previously registered grasping position information.

In an exemplary embodiment, the display device may further include a memory which stores the previously registered finger prints, the previously registered grasping position information, and the previously registered force distribution information.

In an exemplary embodiment, the user authenticator may determine whether the display device may be used through the user authentication.

In an exemplary embodiment, the display device may further include a controller which controls an image displayed on the display panel. The pressure sensor may sense a position and magnitude of a touch which controls an image displayed on the display panel.

In an exemplary embodiment, the biometric sensor may sense a finger print input by the touch and determines by which finger the touch is made.

In an exemplary embodiment, the controller may control the image with reference to a finger that inputs the touch and the magnitude of the touch.

In an exemplary embodiment, the controller may control the image with reference to a finger that inputs the touch, the magnitude of the touch, and an area of the touch.

According to the invention, a security device with an enhanced security function may be provided by performing user authentication using both a biometric sensor and a pressure sensor.

BRIEF DESCRIPTION OF THE DRAWINGS

Exemplary embodiments will now be described more fully hereinafter with reference to the accompanying drawings, in which.

DETAILED DESCRIPTION

Specific items of exemplary embodiments of the invention are included in the detailed description and the accompanying drawings.

Advantages and features of the invention, and implementation methods thereof will be clarified through following exemplary embodiments described with reference to the accompanying drawings. The invention may, however, be embodied in different forms and should not be construed as limited to the exemplary embodiments set forth herein. Throughout this specification and the claims that follow, when it is described that an element is "connected" to another element, the element may be "directly connected" to the other element or "electrically connected" to the other element through a third element. In the accompanying drawings, a portion irrelevant to description of the invention will be omitted for clarity. Like reference numerals refer to like elements throughout.

It will be understood that when an element is referred to as being "between" two elements, it can be the only element between the two elements, or one or more intervening elements may also be present. Like reference numerals refer to like elements throughout.

It will be understood that when an element is referred to as being "on" another element, it can be directly on the other element or intervening elements may be therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. In an exemplary embodiment, when the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, when the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. In an exemplary embodiment, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

Hereinafter, a security device according to an exemplary embodiment of the invention and a display device including the same will be described with reference to the drawings related to the exemplary embodiments of the invention.

Figure 1:
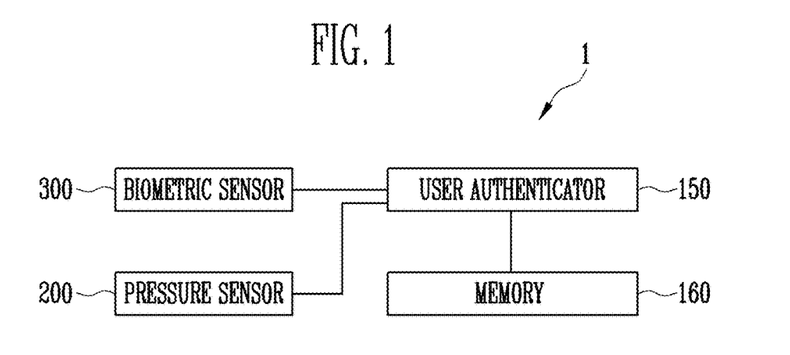
FIG. 1 is a view schematically illustrating an exemplary embodiment of a configuration of a security device according to the invention.

FIG. 1 is a view schematically illustrating a configuration of a security device 1 according to an exemplary embodiment of the invention.

Referring to FIG. 1, the security device 1 according to the exemplary embodiment of the invention may include a pressure sensor 200, a biometric sensor 300, a user authenticator 150, and a memory 160.

The pressure sensor 200 senses a contact surface made by a user and may obtain force distribution information of the contact surface using pressure applied by the user. The force distribution information may represent which magnitude of force is applied by area of the contact surface.

The biometric sensor 300 may sense biometric information of the user. In an exemplary embodiment, the biometric information of the user may include at least one of the finger print, the palm print, the palm vein, the face, and the iris of the user, for example.

In an exemplary embodiment, the biometric sensor 300 may include a finger print sensor for sensing the finger print, an optical sensor or an ultrasonic sensor for sensing the palm print or the palm vein, and an image photographing unit for sensing the face or the iris, for example.

The user authenticator 150 may perform the user authentication with reference to the force distribution information obtained by the pressure sensor 200 and the biometric information obtained by the biometric sensor 300.

Specifically, the user authenticator 150 compares the biometric information obtained by the biometric sensor 300 with previously registered biometric information and may determine whether the obtained biometric information coincides with the previously registered biometric information.

In addition, the user authenticator 150 compares the force distribution information obtained by the pressure sensor 200 with previously registered force distribution information and may determine whether the obtained force distribution information coincides with the previously registered force distribution information.

The user authenticator 150 may determine that the user is a legal user when the biometric information obtained by the biometric sensor 300 coincides with the previously registered biometric information and the force distribution information obtained by the pressure sensor 200 coincides with the previously registered force distribution information.

In contrast, the user authenticator 150 may determine that the user is not the legal user when the biometric information obtained by the biometric sensor 300 does not coincide with the previously registered biometric information or the force distribution information obtained by the pressure sensor 200 does not coincide with the previously registered force distribution information.

The memory 160 may store the biometric information items of the legal user.

In the security device 1 according to the exemplary embodiment of the invention, since the user authentication is performed using the pressure sensor 200 as well as the biometric sensor 300, a security function may be further enhanced.

Hereinafter, a detailed operation method of the security device 1 when applied to each of a display device, a security gate, and a vehicle will be described.

FIGS. 2A through 2F are views illustrating a structure of a display device including the security device 1 of FIG. 1.

The security device 1 according to the exemplary embodiment of the invention may be applied to the display device. At this time, the security device 1 may determine whether the user who desires to use the display device 10*a* through 10*f* is a legal user.

Referring to FIGS. 2A through 2F, the display device 10*a* through 10*f* according to the exemplary embodiment of the invention may include the security device 1 including the pressure sensor 200 and the biometric sensor 300 and a display panel 100.

The display panel 100 may display an image.

The pressure sensor 200 may obtain force distribution information of fingers that grasp the display device 10*a* through 10*f*. In addition, the pressure sensor 200 senses a touch input to the display device 10*a* through 10*f* and may calculate a position and magnitude of the touch. In particular, the pressure sensor 200 simultaneously senses multiple touches and may calculate positions and magnitudes of the multiple touches.

That is, when the security device 1 is included in the display device 10*a* through 10*f*, the pressure sensor 200 may perform a function of sensing a touch for controlling an operation of the display device 10*a* through 10*f* as well as a function of obtaining the force distribution information for performing the user authentication.

The pressure sensor 200 may sense touches input to a rear surface (e.g., lower surface in FIG. 2A) and an edge surface (e.g., side surface in FIG. 2A) of the display device 10*a* through 10*f* as well as a touch input to a front surface (e.g., upper surface in FIG. 2A) of the display device 10*a* through 10*f* on which the image is displayed. The biometric sensor 300 may sense the biometric information of the user who contacts the display device 10*a* through 10*f*. In particular, when the security device 1 is included in the display device 10*a* through 10*f*, the biometric sensor 300 may be a finger print sensor for sensing the finger print of the user.

In an exemplary embodiment, the biometric sensor 300 may include at least one of an optical finger print authentication sensor for obtaining a finger print image reflected to visible rays, an ultrasonic finger print authentication sensor in which ultrasonic waves are used, and a capacitance type finger print authentication sensor in which a difference in capacitance is used, for example.

The biometric sensor 300 may simultaneously sense multiple finger prints. In addition, all the finger prints input to the front surface, the rear surface, and the edge surface of the display device 10*a* through 10*f* may be sensed.

Positions of the display panel 100, the pressure sensor 200, and the biometric sensor 300 may vary.

Figure 2A:
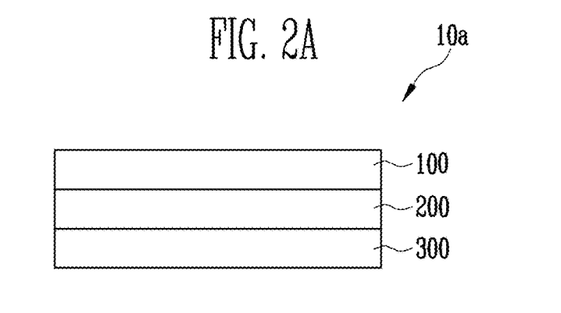
FIGS. 2A through 2F are views illustrating a structure of a display device including the security device of FIG. 1.

Referring to FIG. 2A, the display panel 100 is disposed on the pressure sensor 200 and the pressure sensor 200 may be disposed on the biometric sensor 300.

Figure 2B:
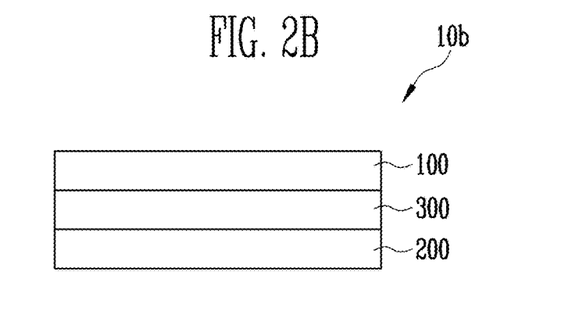

Referring to FIG. 2B, the display panel 100 is disposed on the biometric sensor 300 and the biometric sensor 300 may be disposed on the pressure sensor 200.

Figure 2C:
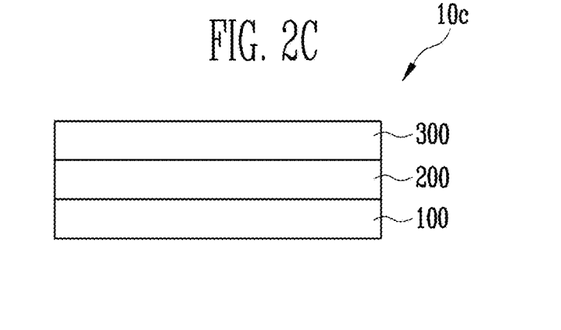

Referring to FIG. 2C, the biometric sensor 300 is disposed on the pressure sensor 200 and the pressure sensor 200 may be disposed on the display panel 100.

Figure 2D:
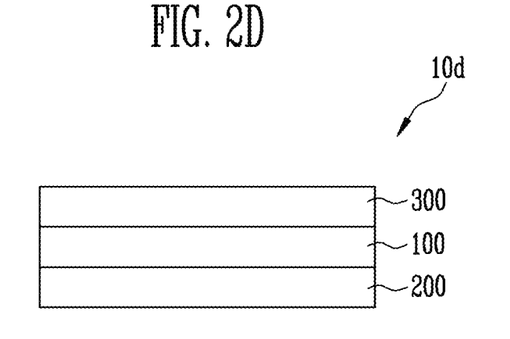

Referring to FIG. 2D, the biometric sensor 300 is disposed on the display panel 100 and the display panel 100 may be disposed on the pressure sensor 200.

Figure 2E:
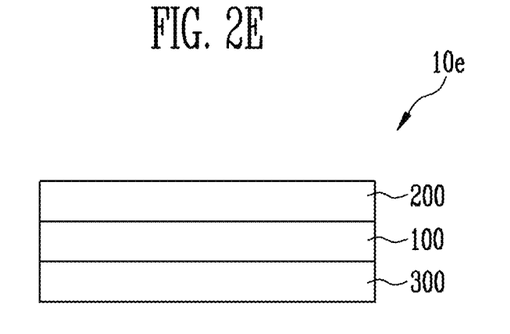

Referring to FIG. 2E, the pressure sensor 200 is disposed on the display panel 100 and the display panel 100 may be disposed on the biometric sensor 300.

Figure 2F:
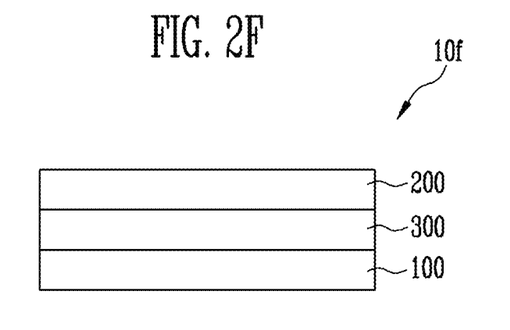

Referring to FIG. 2F, the pressure sensor 200 is disposed on the biometric sensor 300 and the biometric sensor 300 may be disposed on the display panel 100.

At this time, the display panel 100 may display an image through both opposite edge surfaces of the display device 10*a* through 10*f* as well as the front surface of the display device 10*a* through 10*f*.

In addition, when the pressure sensor 200 or the biometric sensor 300 is disposed on the display panel 100, the pressure sensor 200 or the biometric sensor 300 may include a transparent material so as not to deteriorate visibility of the image displayed by display panel 100 disposed below the pressure sensor 200 or the biometric sensor 300.

Figure 3:
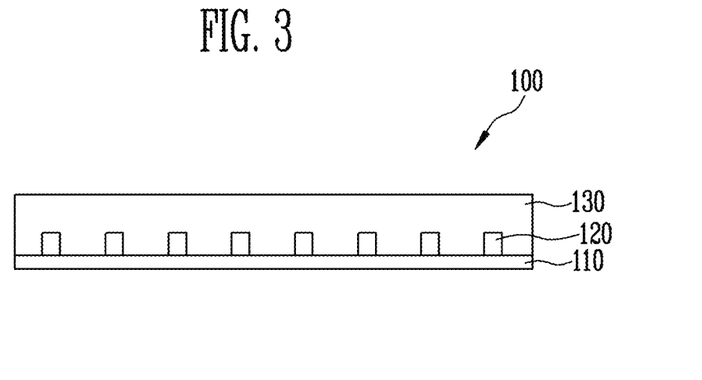
FIG. 3 is a view illustrating a configuration of the display panel of FIGS. 2A through 2F.

FIG. 3 is a view illustrating a configuration of the display panel of FIGS. 2A through 2F.

Referring to FIG. 3, the display panel 100 according to the exemplary embodiment of the invention may include a substrate 110, pixels 120, and an encapsulation layer 130.

The plurality of pixels 120 may be disposed on the substrate 110. In addition, the encapsulation layer 130 may be disposed on the pixels 120 and the substrate 110.

In an exemplary embodiment, the substrate 110 may include an insulating material such as glass or resin, for example. In an exemplary embodiment, the substrate 110 may include a flexible material so as to be curved or folded and may have a single layer structure or a multilayer structure.

In an exemplary embodiment, the substrate 110 may include at least one of polystyrene, polyvinyl alcohol, polymethyl methacrylate, polyethersulfone, polyacrylate, polyetherimide, polyethylene naphthalate, polyethylene terephthalate, polyphenylene sulfide, polyarylate, polyimide, polycarbonate, triacetate cellulose, and cellulose acetate propionate, for example.

In an exemplary embodiment, the material that forms the substrate 110 may vary and may include fiber glass reinforced plastic ("FRP"), for example.

The pixels 120 may emit light components by control of a controller (not shown) and may be protected by the encapsulation layer 130.

In an exemplary embodiment, the encapsulation layer 130 may prevent moisture and oxygen from permeating into the pixels 120, for example.

In an exemplary embodiment, the encapsulation layer 130 may include at least one of glass, an organic material, and an inorganic material and may have a single layer structure or a multilayer structure.

In an exemplary embodiment, the encapsulation layer 130 may have a multilayer structure including at least one organic layer and at least one inorganic layer, for example.

In an exemplary embodiment, an organic insulating material such as a polyacryl based compound, a polyimide based compound, a fluorine based carbon compound such as teflon, a polyepoxy based compound, or a benzocyclobutene compound may be used as the organic layer, for example. In an exemplary embodiment, an inorganic insulating material such as polysiloxane, a silicon nitride, a silicon oxide, or a metal oxide including an aluminum (Al) oxide may be used as the inorganic layer, for example.

Figure 4A:
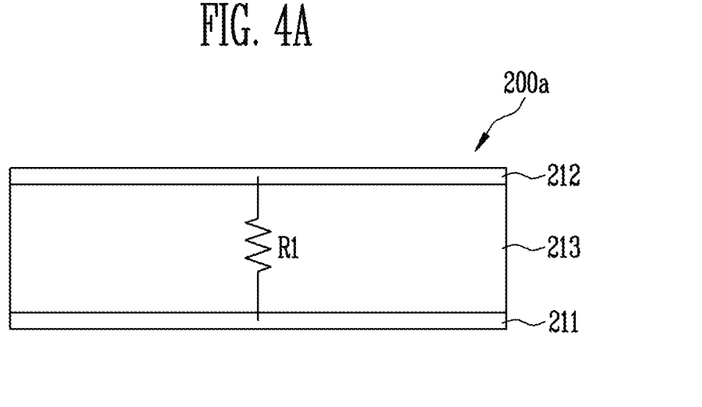
FIGS. 4A and 4B are views illustrating an exemplary embodiment of a configuration and an operation method of a pressure sensor according to the invention.
Figure 4B:
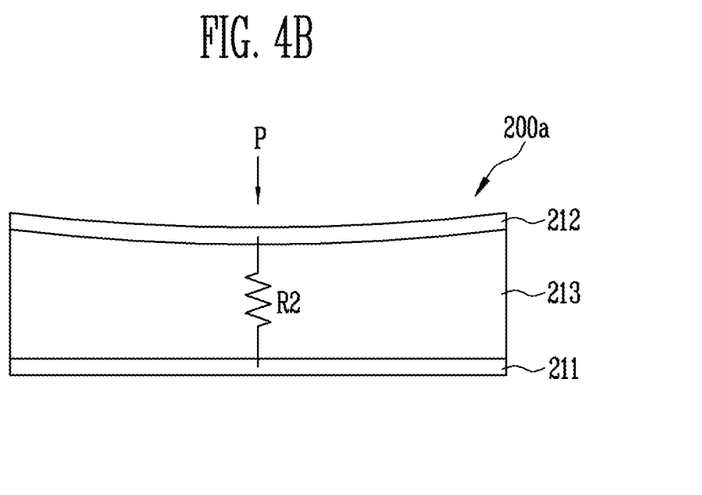

FIGS. 4A and 4B are views illustrating a configuration and an operation method of a pressure sensor according to an exemplary embodiment of the invention.

The pressure sensor according to the exemplary embodiment of the invention may include a plurality of sensing cells 200a for sensing pressure.

Referring to FIG. 4A, each of the sensing cells 200a may include a first electrode 211, a second electrode 212, and a variable resistance element 213 provided between the first and second electrodes 211 and 212.

The first electrode 211 may include a conductive material. The conductive material may include metals or an alloy of the metals. In an exemplary embodiment, the metals may be gold (Au), silver (Ag), Al, molybdenum (Mo), chrome (Cr), titanium (Ti), nickel (Ni), neodymium (Nd), copper (Cu), and platinum (Pt), for example.

The first electrode 211 may include a transparent conductive material. In an exemplary embodiment, the transparent conductive material may be silver nanowire (AgNW), indium tin oxide ("ITO"), indium zinc oxide ("IZO"), antimony zinc oxide ("AZO"), indium tin zinc oxide ("ITZO"), zinc oxide (ZnO), tin oxide (SnO2), carbon nanotube, or graphene, for example.

Next, the second electrode 212 separate from the first electrode 211 may include a conductive material. The conductive material may be selected from materials that may form the first electrode 211. The first and second electrodes 211 and 212 may include the same material with each other or different materials from each other.

Next, the variable resistance element 213 may be provided between the first electrode 211 and the second electrode 212.

The variable resistance element 213 of which an electric characteristic changes in accordance with a degree of transformation may include a material of which resistance changes in accordance with external pressure between the first electrode 211 and the second electrode 212.

In an exemplary embodiment, as force provided to the variable resistance element 213 increases, resistance of the variable resistance element 213 may be reduced, for example. However, the invention is not limited thereto, and in another exemplary embodiment, as the force provided to the variable resistance element 213 increases, the resistance of the variable resistance element 213 may increase.

The variable resistance element 213 may include a material of which resistance changes in accordance with pressure. In an exemplary embodiment, the variable resistance element 213 may include materials referred to as a force sensitive material or a force sensitive resistor.

In an exemplary embodiment, the variable resistance element 213 may include at least one of piezo-electric materials such as lead zirconate titanate ("PZT"), $BaTiO_3$, polytrifluoroethylene (PTrFE), and polyvinylidene fluoride ("PVDF"), piezo-electric semiconductor such as polycrystal, PMN-PT single crystal, ZnO, or $MoS_2$, carbon powder, quantum tunneling composite ("QTC"), silicon, carbon nanotube, and graphene, for example.

The variable resistance element 213 may include nanoparticles. In an exemplary embodiment, the nanoparticles 213 may be provided as a nanotube, a nano-column, a nano-rod, nano-pore, or nanowire, for example.

The nanoparticles 213 may include particles of carbon, graphite, metamorphosis metalloid, metal, a conductive oxide of the metamorphosis metalloid or the metal, or a conductive nitride of metamorphosis metalloid or the metal or may include core shell structured particles in which the particles are coated on an insulating bead or a combination of the above particles. In an exemplary embodiment, the metamorphosis metalloid may include one of antimony (Sb), germanium (Ge), and arsenic (As) or an alloy of the above metals, for example. In an exemplary embodiment, the metal may include zinc (Zn), aluminum (Al), scandium (Sc), chrome (Cr), manganese (Mn), iron (Fe), cobalt (Co), nicel (Ni), copper (Cu), indium (In), tin (Sn), yttrium (Y), zirconium (Zr), niobium (Nb), molybdenum (Mo), ruthenium (Ru), rhodium (Rh), palladium (Pd), gold (Au), silver (Ag), platinum (Pt), strontium (Sr), tungsten (W), cadmium (Cd), tantalum (Ta), titanium (Ti), or an alloy of the above metals, for example. In an exemplary embodiment, the conductive oxide may include ITO, IZO, AZO, gallium indium zinc oxide ("GIZO"), zinc oxide (ZnO), or a combination of the above oxides, for example.

FIG. 4A illustrates a state in which pressure P (refer to FIG. 4B) is not applied to the sensing cell 200a and FIG. 4B illustrates a state in which the pressure P is applied to the sensing cell 200a.

Referring to FIG. 4A, when the pressure P is not applied to the sensing cell 200a, the first electrode 211 and the second electrode 212 are separate from each other by a first distance with the variable resistance element 213 interposed therebetween and the variable resistance element 213 may have first resistance R1.

Referring to FIG. 4B, when the pressure P is applied to the sensing cell 200a in accordance with the touch of the user, the distance between the first electrode 211 and the second electrode 212 changes so that a shape of the variable resistance element 213 may change. That is, the resistance of the variable resistance element 213 may change from first resistance R1 to second resistance R2.

As a result, the position and magnitude of the touch may be detected with reference to an amount of change in resistance reflected to a sensing signal output from the first electrode 211 or the second electrode 212.

Although not shown in FIGS. 4A and 4B, wiring lines for driving the sensing cell 200a and receiving the sensing signal from the sensing cell 200a may be connected to the sensing cell 200a.

Figure 5A:
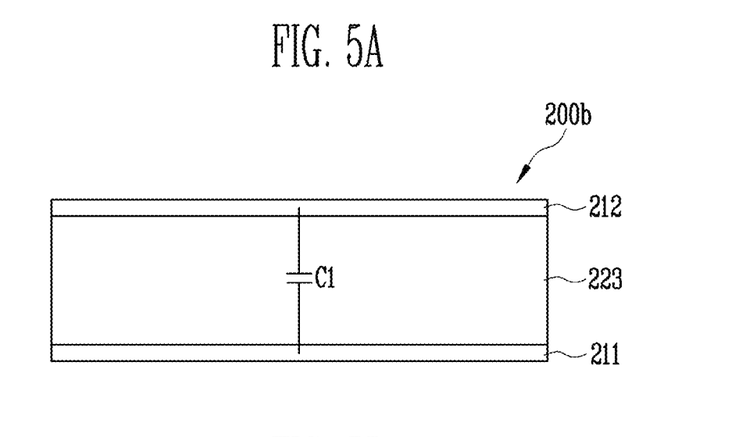
FIGS. 5A and 5B are views illustrating another exemplary embodiment of a configuration and an operation method of a pressure sensor according to the invention.
Figure 5B:
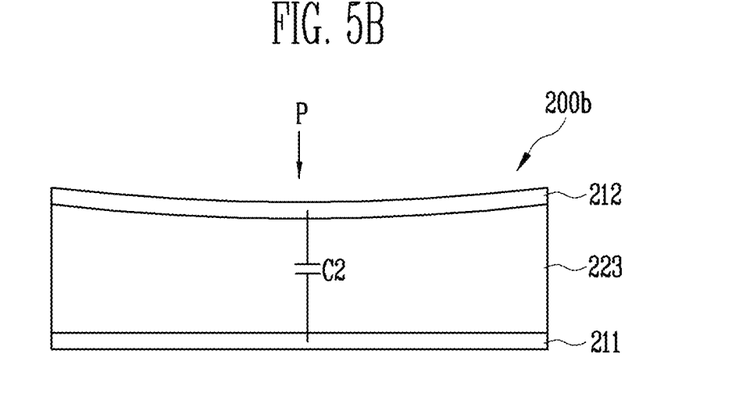

FIGS. 5A and 5B are views illustrating a configuration and an operation method of a pressure sensor according to another exemplary embodiment of the invention.

The pressure sensor according to the exemplary embodiment of the invention may include sensing cells 200b according to another exemplary embodiment.

Referring to FIG. 5A, the sensing cell 200b according to the exemplary embodiment of the invention may include the first electrode 211, the second electrode 212, and an elastic member 223 provided between the first and second electrodes 211 and 212.

The first electrode 211 and the second electrode 212 may be separate from each other. At this time, the first electrode 211 and the second electrode 212 may function as capacitors and capacitance may be generated between the first electrode 211 and the second electrode 212.

The elastic member 223 may release external shock and may have elasticity. In an exemplary embodiment, the elastic member 223 may have elasticity by which the elastic member 223 is transformed by external pressure and is restored to an original state when the external pressure is removed, for example.

In addition, the elastic member 223 may have insulation property in order to prevent electric short between the first electrode 211 and the second electrode 212.

The elastic member 223 may include porous polymer so as to have elasticity. In an exemplary embodiment, the elastic member 223 may include a foaming agent such as sponge, for example.

In an exemplary embodiment, the elastic member 223 may include at least one of thermoplastic elastomer, polystyrene, polyolefin, polyurethane thermoplastic elastomers, polyamides, synthetic rubbers, polydimethylsiloxane, polybutadiene, polyisobutylene, [poly(styrene-butadienes-tyrene)], polyurethanes, polychloroprene, polyethylene, silicon, and combinations of the above materials, for example. However, the invention is not limited thereto.

FIG. 5A illustrates a state in which the pressure P (refer to FIG. 5B) is not applied to the sensing cell 200b and FIG. 5B illustrates a state in which the pressure P is applied to the sensing cell 200b.

Referring to FIG. 5A, when the pressure P is not applied to the sensing cell 200b, the first electrode 211 and the second electrode 212 are separate from each other by the first distance with the elastic member 223 interposed and first capacitance C1 may be generated between the first electrode 211 and the second electrode 212.

Referring to FIG. 5B, when the pressure P is applied to the sensing cell 200b in accordance with the touch of the user, the distance between the first electrode 211 and the second electrode 212 changes so that the capacitance between the first electrode 211 and the second electrode 212 may change. That is, second capacitance C2 may be generated between the first electrode 211 and the second electrode 212.

As a result, the position and magnitude of the touch may be detected with reference to the amount of change in capacitance reflected to the sensing signal output from the first electrode 211 or the second electrode 212.

Although not shown in FIGS. 5A and 5B, wiring lines for driving the sensing cell 200b and receiving the sensing signal from the sensing cell 200b may be connected to the sensing cell 200b.

Figure 6:
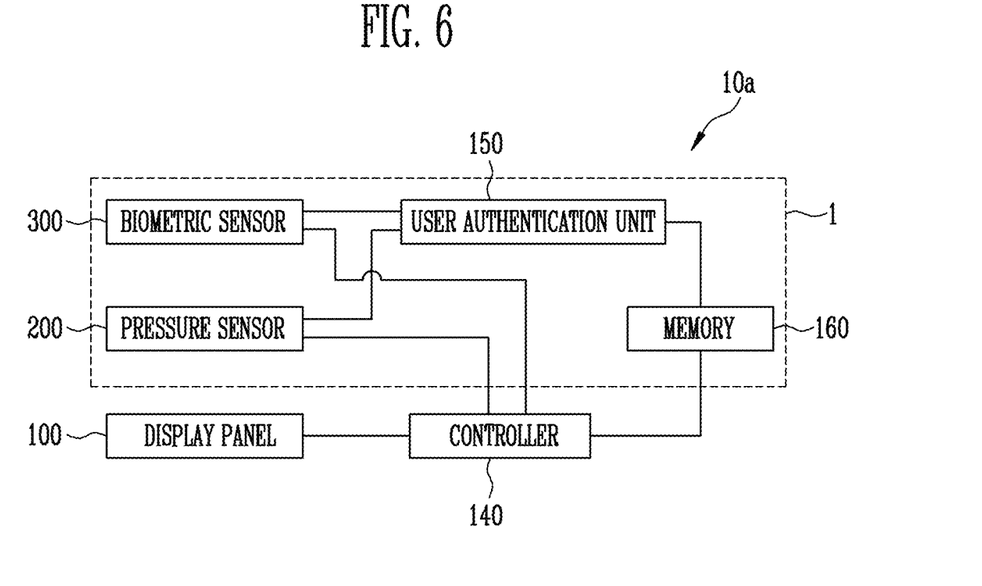
FIG. 6 is a view illustrating an exemplary embodiment of a display device further including a user authenticator and a controller according to the invention.

FIG. 6 is a view illustrating a display device further including a user authenticator and a controller according to an exemplary embodiment of the invention. In FIG. 6, the display device 10a of FIG. 2A is illustrated. The controller may be also included in the display device 10b through 10f of FIGS. 2B through 2F.

Referring to FIG. 6, the display device 10a according to the exemplary embodiment of the invention may further include a controller 140 as well as the security device 1 including the pressure sensor 200, the biometric sensor 300, and the user authenticator 150 and the display panel 100.

The user authenticator 150 may perform the user authentication with reference to the biometric information received from the biometric sensor 300 and the force distribution information obtained by the pressure sensor 200.

Specifically, the user authenticator 150 may compare finger prints of fingers that grasp the display device 10a with previously registered finger prints.

In addition, the user authenticator 150 may compare positions of input touches with previously registered grasping position information by grasping the display device 10a. In addition, the user authenticator 150 may compare magnitudes of the input touches with previously registered force distribution information by grasping the display device 10a.

The user authenticator 150 may let the display device 10a operate when the finger prints of the fingers that grasp the display device 10a coincide with the previously registered finger prints and the magnitudes of the touches coincide with the previously registered force distribution information. That is, the user authenticator 150 may control the display device 10a to be activated in a locked state.

The user authenticator 150 may control the display device 10a not to operate, that is, may prevent the locked state of the display device 10a from being released when the finger prints of the fingers that grasp the display device 10a do not coincide with at least one of the previously registered finger prints, the magnitudes of the touches, and the previously registered force distribution information.

The user authenticator 150 may further determine whether the positions of the touches coincide with the previously registered grasping position information in the performing of the user authentication.

That is, the user authenticator 150 may control the display device 10a to operate only when the finger prints of the fingers that grasp the display device 10a coincide with the previously registered finger prints, the magnitudes of the touches coincide with the previously registered force distribution information, and the positions of the touches coincide with the previously registered grasping position information.

The display device 10a according to the exemplary embodiment of the invention may further include the memory 160 in which at least one of the above-described information on previously registered finger prints, previously registered grasping position information, and previously registered force distribution information are stored.

The information on the previously registered finger prints may include finger print information of all the fingers of the user.

The user of the display device 10a may previously register the finger prints of the fingers, the force distribution information when the display device is grasped, and the grasping position information in the display device 10a.

Hereinafter, a method of performing the user authentication using the security device included in the display device will be described with reference to FIGS. 7A and 7B.

Figure 7A:
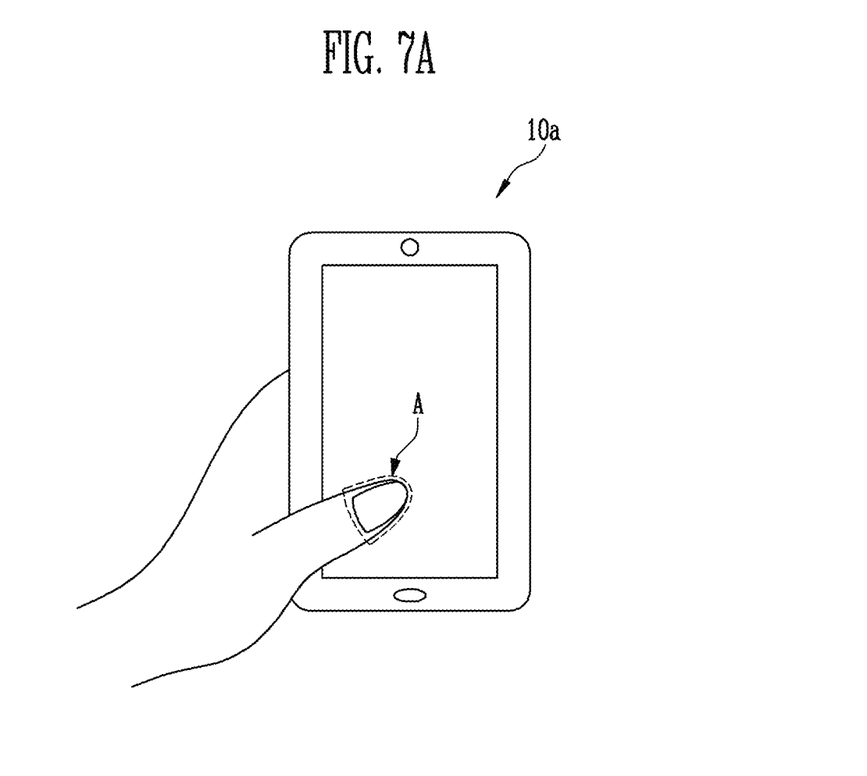
FIGS. 7A and 7B are views exemplarily illustrating a state in which a user grasps a display device.
Figure 7B:
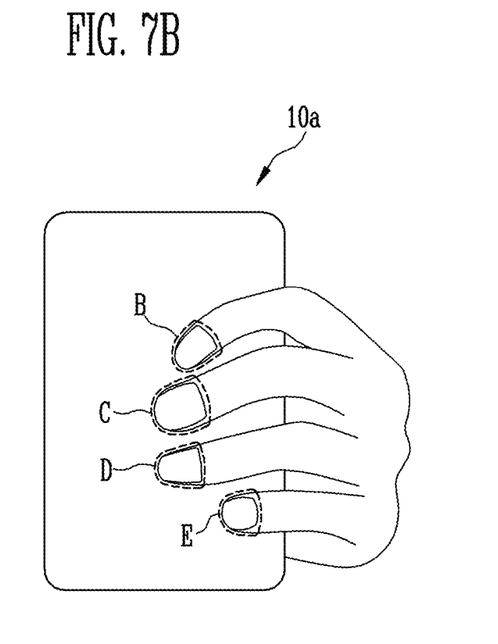

FIGS. 7A and 7B are views exemplarily illustrating a state in which a user grasps a display device. In particular, FIG. 7A illustrates a front surface of the display device 10a and FIG. 7B illustrates a rear surface of the display device 10a.

As illustrated in FIGS. 7A and 7B, when the display device 10a is grasped, contact surfaces A through E are generated between the user and the display device 10a.

The biometric sensor 300 (refer to FIG. 6) may sense all the finger prints input to the contact surfaces A through E and the user authenticator 150 may compare the finger prints with the information on the previously registered finger prints.

Specifically, the user authenticator 150 may determine whether the finger prints input to the contact surfaces A through E correspond to the previously registered finger prints of the thumb, the forefinger, the middle finger, the ring finger, and the little finger of the user, Then, the pressure sensor 200 (refer to FIG. 6) may calculate the magnitudes of forces respectively applied to the contact surfaces A through E. The user authenticator 150 may compare the magnitudes of forces respectively applied to the contact surfaces A through E with the force distribution information.

Here, the force distribution information may include, for example, information on which magnitudes of forces are applied to which fingers when the user grasps the display device 10a.

The user authenticator 150 (refer to FIG. 6) may perform control so that the locked state of the display device 10a is released when the finger prints input to the contact surfaces A through E coincide with the previously registered finger prints and the magnitudes of the forces respectively applied to the contact surfaces A through E coincide with the previously registered force distribution information.

In addition, the pressure sensor 200 may calculate position information items of the contact surfaces A through E. The user authenticator 150 may determine whether the positions of the contact surfaces A through E correspond to the previously registered grasping position information.

A way in which each user grasps the display device 10a in order to use the display device 10a may vary. Therefore, as described above, the user authentication may be performed using the force distribution information and the grasping position when the display device is grasped as well as the biometric information.

The biometric sensor 300, the pressure sensor 200, the user authenticator 150, and the memory 160 (refer to FIG. 6) that are included in the display device 10a may operate as the security device 1 for preventing information items stored in the display device 10a from leaking. The user may control the image displayed in the display device by touching the display device 10a. Hereinafter, an image controlling method of the display device according to the exemplary embodiment of the invention will be described in detail.

Referring to FIG. 6, the controller 140 may control image display operation of the display panel 100.

When a touch for controlling the image displayed on the display panel 100 is input, the controller 140 may let control operation performed in accordance with input finger print information and a magnitude of the touch vary.

For this purpose, when the display device 10a is in a lock released state, when a touch is input to the display device 10a, the controller 140 may determine by which finger the touch is made using finger print information received from the biometric sensor 300.

The biometric sensor 300 determines by which finger the touch is made using finger print information received from the biometric sensor 300 and may transmit the determination result to the controller 140.

In addition, the controller 140 may obtain information items on a position of the touch, a magnitude of the touch, and an area of the touch from the pressure sensor 100.

The controller 140 may let control operation performed by a finger that inputs the touch vary. In an exemplary embodiment, when the touch is input by the left thumb, brightness of the image is controlled and, when the touch is input by the left forefinger, a scroll function may be controlled, for example.

In addition, although the touch is input by the same finger, the controller 140 may let control operation performed in accordance with a magnitude of the touch vary.

In an exemplary embodiment, the controller 140 performs control so that the brightness of the image increases when the touch is input by the left thumb and the magnitude of the touch is large and may perform control so that the brightness of the image is reduced when the magnitude of the touch is substantially small, for example.

In addition, the controller 140 performs control so that scroll down occurs when the touch is input by the left thumb and the magnitude of the touch is large and may perform control so that scroll up occurs when the magnitude of the touch is substantially small.

At this time, the controller 140 determines that the magnitude of the touch is large when the magnitude of the touch is equal to or greater than a predetermined value and may determine that the magnitude of the touch is substantially small when the magnitude of the touch is less than the predetermined value.

The controller 140 may control the image display operation considering the area of the touch as well as the finger print information and the magnitude of the touch. In an exemplary embodiment, the controller 140 may perform control so that the scroll function is controlled when the touch is input by the left thumb in a substantially small area and that copy and paste operation of the displayed image is performed when the touch is input in a substantially large area, for example.

The controller 140 may control the image display operation further considering a rotation direction of the touch. In an exemplary embodiment, when the touch is input by the left thumb, the magnitude of the touch is substantially large, and the touch moves while rotating in a predetermined direction, the controller 140 may perform control so that at least a part of the displayed image rotates, for example.

The controller 140 may let the above-described operation performed only when the touch input is maintained for a time period equal to or greater than a predetermined time. In an exemplary embodiment, the controller may perform control so that the scroll down occurs only when the display device is substantially strongly touched by the left thumb for a time period equal to or greater than the predetermined time, for example.

A kind of control operation corresponding to a combination of a finger that inputs the touch, the magnitude of the touch, the area of the touch, and the rotation of the touch may be stored in the memory 160.

Figure 8:
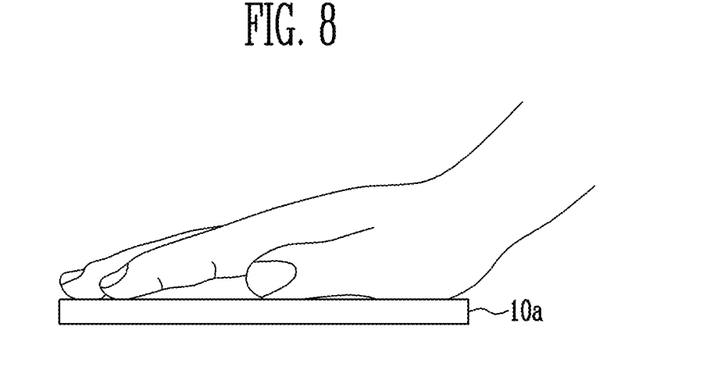
FIG. 8 is a view exemplarily illustrating an exemplary embodiment showing that a palm of a user is sensed using a display device including a security device according to the invention.

According to the current specification, the locked state of the display device 10a means that no operation is performed on a touch input or a key input and the lock released state may mean any state excluding the locked state. FIG. 8 is a view exemplarily illustrating that a palm of a user is sensed using a display device including a security device according to an exemplary embodiment of the invention.

The display device 10a including the security device 1 (refer to FIG. 1) according to an exemplary embodiment of the invention may perform the user authentication by sensing a palm print or a palm vein other than a finger print as biometric information.

As illustrated in FIG. 8, when the user touches the display device 10a by his or her palm, the biometric sensor 300 (refer to FIG. 6) may sense the palm print or the palm vein of the user.

In addition, the pressure sensor 200 (refer to FIG. 6) may obtain the force distribution information of the contact surface between the palm and the display device 10a. Since a shape of a palm varies with each user, when force is applied to the display device using the palm, a magnitude of the force applied to each area of the contact surface may vary with each user.

The user authenticator 150 (refer to FIG. 6) may determine that the user is a legal user when the palm print or palm vein information of the user obtained by the biometric sensor 300 coincides with previously registered palm or vein information and the force distribution information obtained by the pressure sensor 200 coincides with previously registered force distribution information.

Figure 9:
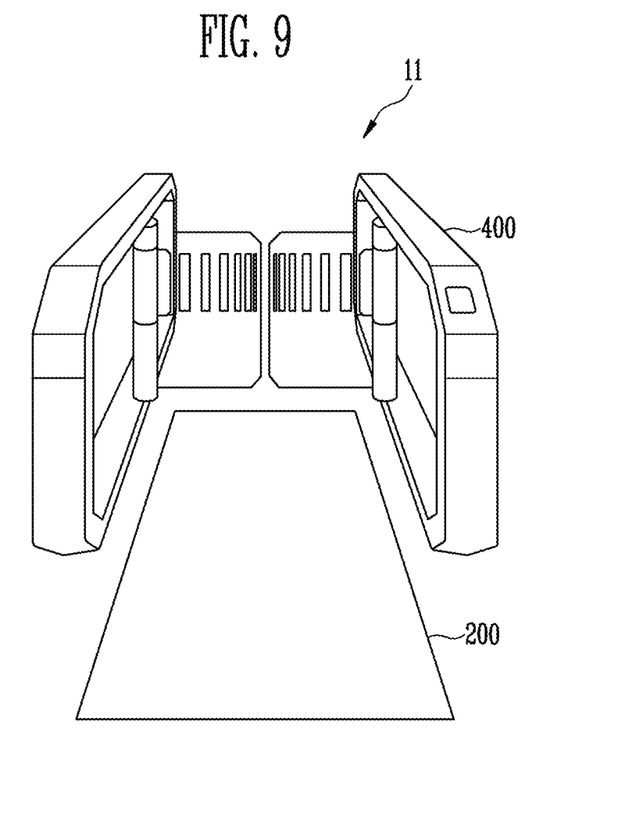
FIG. 9 is a view schematically illustrating a configuration of an access control system including the security device of FIG. 1.

FIG. 9 is a view schematically illustrating a configuration of an access control system 11 including the security device of FIG. 1.

The security device 1 (refer to FIG. 1) according to the exemplary embodiment of the invention may be included in an access control system 11. At this time, the security device 1 determines whether the user may access a specific place and may limit access of the user.

Referring to FIG. 9, the access control system 11 including the security device 1 according to the exemplary embodiment of the invention may include a security gate 400.

The biometric sensor 300 (refer to FIG. 1) may sense the face or iris of the user who desires to pass through the security gate 400.

For this purpose, although not shown in FIG. 9, the access control system 11 may further include an image photographing unit for photographing the face or iris of the user.

Figure 10:
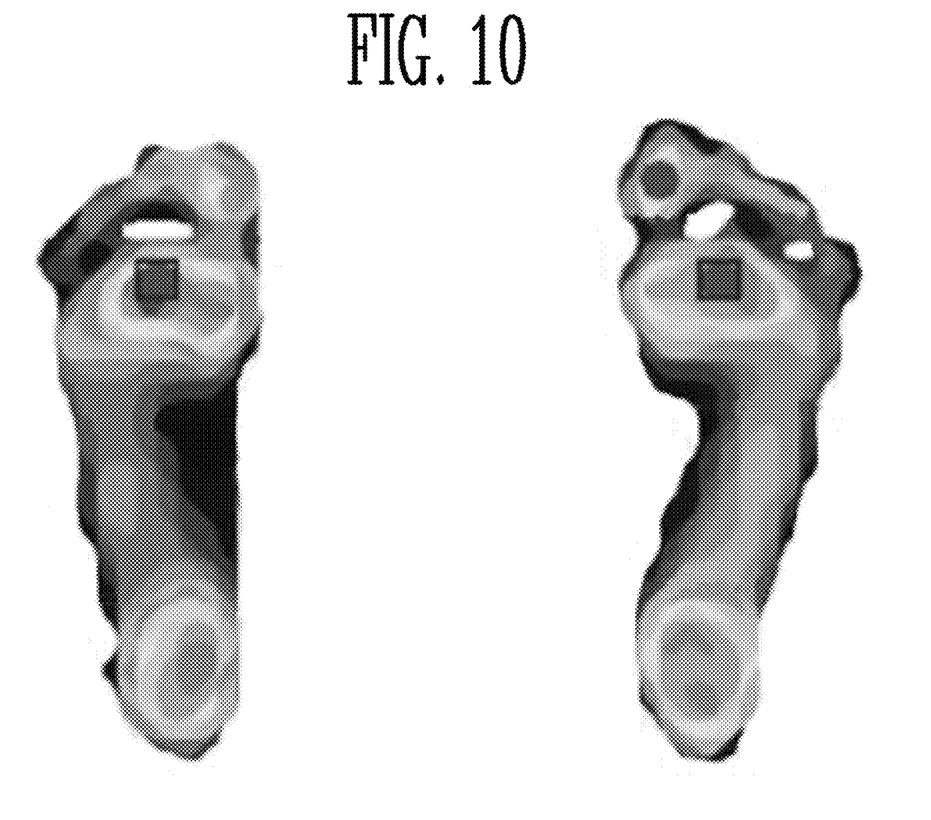
FIG. 10 is a view exemplarily illustrating force distribution information obtained using the access control system of FIG. 9.

The pressure sensor 200 may obtain force distribution information of a sole of the user, for example, the force distribution information of FIG. 10.

FIG. 10 is a view exemplarily illustrating force distribution information obtained using the access control system 11 of FIG. 9, in which the magnitude of the force applied by the user is shadowed.

At this time, the pressure sensor 200 may be disposed on a bottom so that the user may step on the pressure sensor 200 while walking toward the security gate 400. Since a weight and walking of each user vary, force distribution of a contact surface between the sole of the user and the pressure sensor 200 may vary.

The user authenticator 150 may perform control so that the security gate 400 is opened when the user face or iris information obtained by the biometric sensor 300 coincides with previously registered face or iris information and the force distribution information obtained by the pressure sensor 200 coincides with previously registered force distribution information.

Figure 11:
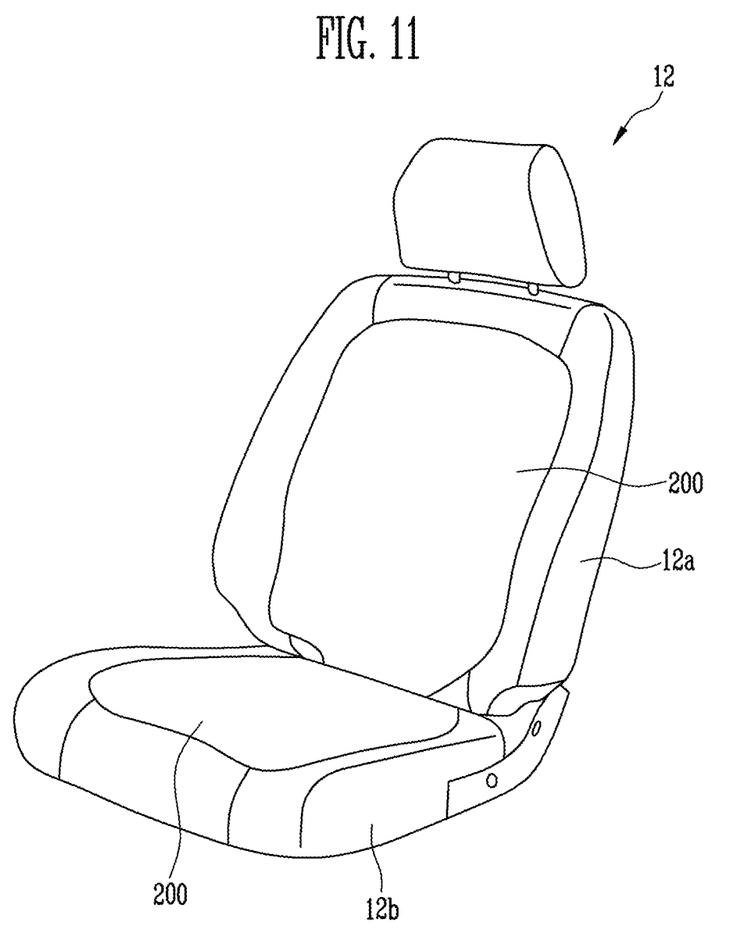
FIG. 11 is a view illustrating an exemplary embodiment of a seat of a vehicle including a security device according to the invention.

FIG. 11 is a view illustrating a seat of a vehicle including a security device according to an exemplary embodiment of the invention.

The security device 1 (refer to FIG. 1) according to the exemplary embodiment of the invention may be applied to a vehicle control system. At this time, the security device 1 may determine whether the user who gets on the vehicle is a legal user.

When it is determined in a user authentication performing process that the user who gets on the vehicle is the legal user, the security device 1 may perform control so that the vehicle operates in accordance with manipulation of the user. When it is determined that the user who gets on the vehicle is an illegal user, the security device 1 may perform control so that the vehicle does not operate although the user manipulates the vehicle.

First, the biometric sensor 300 (refer to FIG. 1) may sense the face or iris of the user who gets on the vehicle.

For this purpose, although not shown in FIG. 11, the image photographing unit for photographing the face or iris of the user may be further included in the vehicle. In particular, the image photographing unit may be disposed on a front surface of a seat 12.

The pressure sensor 200 may obtain the force distribution information of the user who gets on the seat 12.

The seat 12 may include a seat unit 12b for supporting the legs of the user and a back unit 12a for supporting the back of the user.

The pressure sensor 200 may be disposed on the seat unit 12b and the back unit 12a.

The user authenticator 150 (refer to FIG. 1) determines whether the face or iris information of the user obtained by the biometric sensor 300 coincides with the previously registered face or iris information and may determine whether the force distribution information obtained by the pressure sensor 200 coincides with the previously registered force distribution information.

Exemplary embodiments have been disclosed herein, and although specific terms are employed, they are used and are to be interpreted in a generic and descriptive sense only and not for purpose of limitation. In some instances, as would be apparent to one of ordinary skill in the art as of the filing of the application, features, characteristics, and/or elements described in connection with a particular exemplary embodiment may be used singly or in combination with features, characteristics, and/or elements described in connection with other exemplary embodiments unless otherwise specifically indicated. Accordingly, it will be understood by those of skill in the art that various changes in form and details may be made without departing from the spirit and scope of the invention as set forth in the following claims.

What is claimed is:

1. A security device comprising:
    a pressure sensor which senses a plurality of contact surfaces caused by a user and obtains force distribution information of the plurality of contact surfaces;
    a biometric sensor which senses at least one of a plurality of fingerprints corresponding to the plurality of contact surfaces, each of the plurality of fingerprints corresponding to a plurality of fingers of the user; and a user authenticator which performs user authentication with reference to the plurality of fingerprints and the force distribution information.

2. The security device of claim 1, wherein the user authenticator performs the user authentication by comparing the plurality of fingerprints with previously registered biometric information and comparing the force distribution information with previously registered force distribution information.

3. The security device of claim 2, further comprising a memory which stores the previously registered biometric information of the user and the previously registered force distribution information.

4. An access control system comprising the security device as claimed in claim 1.

5. A vehicle security system comprising the security device as claimed in claim 1.

6. A display device comprising:
a pressure sensor which senses a plurality of contact surfaces caused by a user and obtains force distribution information of the plurality of contact surfaces;
a biometric sensor which senses at least one of a plurality of fingerprints corresponding to the plurality of contact surfaces, each of the plurality of fingerprints corresponding to a plurality of fingers of the user;
a user authenticator which performs user authentication with reference to the plurality of fingerprints and the force distribution information; and
a display panel disposed on one surface of one of the plurality of fingerprints and the pressure sensor to display an image.

7. The display device of claim 6, wherein the biometric sensor senses the finger prints of the fingers of the user who grasps the display device.

8. The display device of claim 7, wherein the pressure sensor obtains positions and magnitudes of touches input by the user grasping the display device.

9. The display device of claim 8, wherein the user authenticator performs user authentication by comparing the finger prints of the fingers which grasp the display device with previously registered finger prints and comparing magnitudes of the touches with previously registered force distribution information.

10. The display device of claim 9, wherein the user authenticator performs user authentication by further comparing positions of the touches with previously registered grasping position information.

11. The display device of claim 10, further comprising a memory which stores the previously registered finger prints, the previously registered grasping position information, and the previously registered force distribution information.

12. The display device of claim 9, wherein the user authenticator determines whether the display device is used through the user authentication.

13. The display device of claim 6, further comprising a controller which controls an image displayed on the display panel,
wherein the pressure sensor senses a position and magnitude of a touch which controls an image displayed on the display panel.

14. The display device of claim 13, wherein the biometric sensor senses a finger print input by the touch and determines by which finger the touch is made.

15. The display device of claim 14, wherein the controller controls the image with reference to a finger which inputs the touch and the magnitude of the touch.

16. The display device of claim 14, wherein the controller controls the image with reference to a finger which inputs the touch, the magnitude of the touch, and an area of the touch.

* * * * *